United States Patent
Skog et al.

(10) Patent No.: US 10,721,169 B2
(45) Date of Patent: Jul. 21, 2020

(54) TCP PROXY USING A COMMUNICATION DISTANCE INDICATOR

(71) Applicant: Telefonaktiebolaget LM Ericsson (publ), Stockholm (SE)

(72) Inventors: Robert Skog, Hässelby (SE); Marcus Ihlar, Älvsjö (SE); Magnus Magnusson, Bromma (SE); John Orre, Saltsjöbaden (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/327,935

(22) PCT Filed: Sep. 2, 2016

(86) PCT No.: PCT/EP2016/070746
§ 371 (c)(1),
(2) Date: Feb. 25, 2019

(87) PCT Pub. No.: WO2018/041366
PCT Pub. Date: Mar. 8, 2018

(65) Prior Publication Data
US 2019/0190836 A1 Jun. 20, 2019

(51) Int. Cl.
*H04L 12/26* (2006.01)
*H04L 12/801* (2013.01)
(Continued)

(52) U.S. Cl.
CPC ............ *H04L 47/193* (2013.01); *H04L 47/25* (2013.01); *H04L 47/27* (2013.01); *H04L 47/283* (2013.01);
(Continued)

(58) Field of Classification Search
CPC ..... H04L 12/80; H04L 12/807; H04L 12/825; H04L 12/841; H04L 29/08; H04L 47/193;
(Continued)

(56) References Cited

U.S. PATENT DOCUMENTS 7,328,267 B1* 2/2008 Bashyam ............... H04L 69/16
709/227
9,531,846 B2* 12/2016 Han ..................... H04L 47/283
(Continued)

FOREIGN PATENT DOCUMENTS

EP 2738984 A1 6/2014

OTHER PUBLICATIONS

Hu et al, Enhancing Wireless Internet Performance, IEEE, 14 pages, Mar. 19, 2000.*
(Continued)

*Primary Examiner* — Frank Duong
(74) *Attorney, Agent, or Firm* — Coats & Bennett, PLLC

(57) ABSTRACT

It is provided a method for controlling traffic between a mobile communication terminal (2) and a plurality of hosts (15a-15c), the method being performed in a TCP, Transport Control Protocol, proxy (10) of a cellular network, the TCP proxy comprising a radio side (11) towards the mobile communication terminal, and a network side (12) towards the plurality of hosts. The method comprises the steps of: obtaining a communication distance indicator for each TCP connection between the TCP proxy (10) and each one of the hosts (15a-15c); detecting a constrained traffic situation on the radio side (11) for traffic towards the mobile communication terminal; and reducing incoming traffic on the network side (12) based on the respective communication distance indicators, such that traffic is reduced relatively more for a TCP connection with a large communication distance indicator compared to a TCP connection with a small communication distance indicator.

19 Claims, 4 Drawing Sheets

(51) Int. Cl.
*H04W 80/06* (2009.01)
*H04L 12/825* (2013.01)
*H04L 12/841* (2013.01)
*H04L 29/08* (2006.01)
*H04L 29/06* (2006.01)
*H04L 12/807* (2013.01)
*H04W 28/10* (2009.01)
*H04W 28/02* (2009.01)

(52) U.S. Cl.
CPC .............. *H04L 67/28* (2013.01); *H04L 69/16* (2013.01); *H04W 28/10* (2013.01); *H04W 80/06* (2013.01); *H04W 28/0273* (2013.01)

(58) Field of Classification Search
CPC ....... H04L 47/25; H04L 47/27; H04L 47/283; H04L 67/28; H04L 69/16; H04W 28/0273; H04W 28/10; H04W 80/06
See application file for complete search history.

(56) References Cited

U.S. PATENT DOCUMENTS

| | | | | |
|---|---|---|---|---|
| 9,967,077 | B2* | 5/2018 | Weston | H04L 47/193 |
| 2011/0296006 | A1* | 12/2011 | Krishnaswamy | H04L 45/00 709/224 |
| 2012/0331160 | A1* | 12/2012 | Tremblay | H04L 67/28 709/228 |
| 2013/0114408 | A1 | 5/2013 | Sastry et al. | |
| 2014/0286239 | A1* | 9/2014 | Chowdhury | H04L 1/1812 370/328 |
| 2015/0121473 | A1* | 4/2015 | Yang | H04L 45/306 726/4 |
| 2015/0237173 | A1* | 8/2015 | Virkki | H04L 69/163 709/238 |
| 2015/0319270 | A1* | 11/2015 | Roeland | H04L 61/2007 370/254 |
| 2016/0119903 | A1* | 4/2016 | Skog | H04L 65/4084 370/329 |
| 2017/0366650 | A1* | 12/2017 | Zhu | H04L 43/0864 |

OTHER PUBLICATIONS

Katabi, D., et al., "Internet Congestion Control for Future High Bandwidth-Delay Product Environments", in Proceedings of ACM SIGCOMM, Aug. 1, 2002, pp. 1-16, available online: http://groups.csail.mit.edu/netmit/wordpress/wp-content/themes/netmit/papers/xcp.pdf.

Rajput, N. et al., "Longer Distance Hop Count based Priority Congestion Control Technique for Wireless Sensor Networks", Global Journal of Computer Science and Technology: E Network, Web& Security, vol. 14 Issue 4 Version 1.0, Jan. 1, 2014, pp. 16-22, Global Journals Inc.

* cited by examiner

TCP PROXY USING A COMMUNICATION DISTANCE INDICATOR

TECHNICAL FIELD

The invention relates to a method, TCP proxies, computer program and computer program products for controlling traffic between a mobile communication terminal and a plurality of hosts.

BACKGROUND

Cellular networks for mobile communication have evolved greatly in the past few years. Today, a lot of traffic of cellular networks is made up by data traffic between mobile communication terminals and hosts.

However, compared to networks of fixed hosts, the capacity situation for mobile communication terminals varies greatly over time due to effects such as number of terminals in the same area, fading, multipath propagation, interference, etc.

For this reason, TCP (Transport Control Protocol) proxies have been introduced in cellular networks. The TCP proxies maintain TCP connections on the radio side, towards mobile communication terminals, which are better tailored to the traffic conditions. On the network side, the TCP proxies maintain TCP connections which are tailored to fixed network traffic.

While the TCP proxies address some of the issues of the disparate traffic conditions, the inherent inertia to change in the TCP protocol reduce the ability to react to quickly changing traffic conditions.

SUMMARY

It is an object to improve responsiveness to changing traffic conditions for a TCP proxy.

According to a first aspect, it is provided a method for controlling traffic between a mobile communication terminal and a plurality of hosts, the method being performed in a TCP, Transport Control Protocol, proxy of a cellular network, the TCP proxy comprising a radio side towards the mobile communication terminal, and a network side towards the plurality of hosts. The method comprises the steps of: obtaining a communication distance indicator for each TCP connection between the TCP proxy and each one of the hosts; detecting a constrained traffic situation on the radio side for traffic towards the mobile communication terminal; and reducing incoming traffic on the network side based on the respective communication distance indicators, such that traffic is reduced relatively more for a TCP connection with a large communication distance indicator compared to a TCP connection with a small communication distance indicator.

The communication distance indicator may be a round trip time, RTT.

The step of reducing incoming traffic may comprise reducing incoming traffic for a TCP connection by reducing its receive window.

The step of reducing incoming traffic may comprise reducing incoming traffic for a TCP connection by setting its receive window to zero.

The step of detecting a constrained traffic situation may comprise detecting that durations between acknowledgements increase.

The step of detecting a constrained traffic situation may comprise detecting an increase in packet loss.

The method may further comprise the steps of: detecting a traffic situation with increased capacity on the radio side for traffic towards the mobile communication terminal; and increasing incoming traffic on the network side based on the respective communication distance indicators, such that traffic is increased relatively more for a TCP connection with a small communication distance indicator compared to a TCP connection with a large communication distance indicator.

The step of detecting a traffic situation with increased capacity may comprise detecting that durations between acknowledgements decrease.

The method may be performed in parallel for each one of a plurality of mobile communication terminals.

According to a second aspect, it is provided a TCP, Transport Control Protocol, proxy for controlling traffic between a mobile communication terminal and a plurality of hosts, the TCP proxy being configured to form part of a cellular network. The TCP proxy comprises a radio side intended to be logically directed towards the mobile communication terminal, and a network side intended to be logically directed towards the plurality of hosts. The TCP proxy comprises: a processor; and a memory storing instructions that, when executed by the processor, causes the TCP proxy to: obtain a communication distance indicator for each TCP connection between the TCP proxy and each one of the hosts; detect a constrained traffic situation on the radio side for traffic towards the mobile communication terminal; and reduce incoming traffic on the network side based on the respective communication distance indicators, such that traffic is reduced relatively more for a TCP connection with a large communication distance indicator compared to a TCP connection with a small communication distance indicator.

The communication distance indicator may be a round trip time, RTT.

The instructions to reduce incoming traffic may comprise instructions that, when executed by the processor, causes the TCP proxy to reduce incoming traffic for a TCP connection by reducing its receive window.

The instructions to reduce incoming traffic comprise instructions that, when executed by the processor, causes the TCP proxy to reduce incoming traffic for a TCP connection by setting its TCP proxy window to zero.

The instructions to detect a constrained traffic situation may comprise instructions that, when executed by the processor, causes the TCP proxy to detect that durations between acknowledgements increase.

The instructions to detect a constrained traffic situation may comprise instructions that, when executed by the processor, causes the TCP proxy to detect an increase in packet loss.

The TCP proxy may further comprise instructions that, when executed by the processor, causes the TCP proxy to: detect a traffic situation with increased capacity on the radio side for traffic towards the mobile communication terminal; and increase incoming traffic on the network side based on the respective communication distance indicators, such that traffic is increased relatively more for a TCP connection with a small communication distance indicator compared to a TCP connection with a large communication distance indicator.

The instructions to detect a traffic situation with increased capacity may comprise instructions that, when executed by the processor, causes the TCP proxy to detect that durations between acknowledgements decrease.

The instructions may be configured to be executed in parallel for each one of a plurality of mobile communication terminals.

According to a third aspect, it is provided a TCP, Transport Control Protocol, proxy comprising: means for obtaining a communication distance indicator for each TCP connection between the TCP proxy and each one of a plurality of hosts, the TCP proxy being configured to form part of a cellular network, wherein the TCP proxy comprises a radio side intended to be logically directed towards the mobile communication terminal, and a network side intended to be logically directed towards the plurality of hosts; means for detecting a constrained traffic situation on the radio side for traffic towards the mobile communication terminal; and means for reducing incoming traffic on the network side based on the respective distance indicators, such that traffic is reduced relatively more for a TCP connection with a large communication distance indicator compared to a TCP connection with a small communication distance indicator.

According to a fourth aspect, it is provided a computer program for controlling traffic between a mobile communication terminal and a plurality of hosts. The computer program comprises computer program code which is run on a TCP proxy being configured to form part of a cellular network, the TCP proxy comprising a radio side intended to be logically directed towards the mobile communication terminal, and a network side intended to be logically directed towards the plurality of hosts. The running of the computer program code causes the TCP proxy to: obtain a communication distance indicator for each TCP connection between the TCP proxy and each one of the hosts; detect a constrained traffic situation on the radio side for traffic towards the mobile communication terminal; and reduce incoming traffic on the network side based on the respective distance indicators, such that traffic is reduced relatively more for a TCP connection with a large communication distance indicator compared to a TCP connection with a small communication distance indicator.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
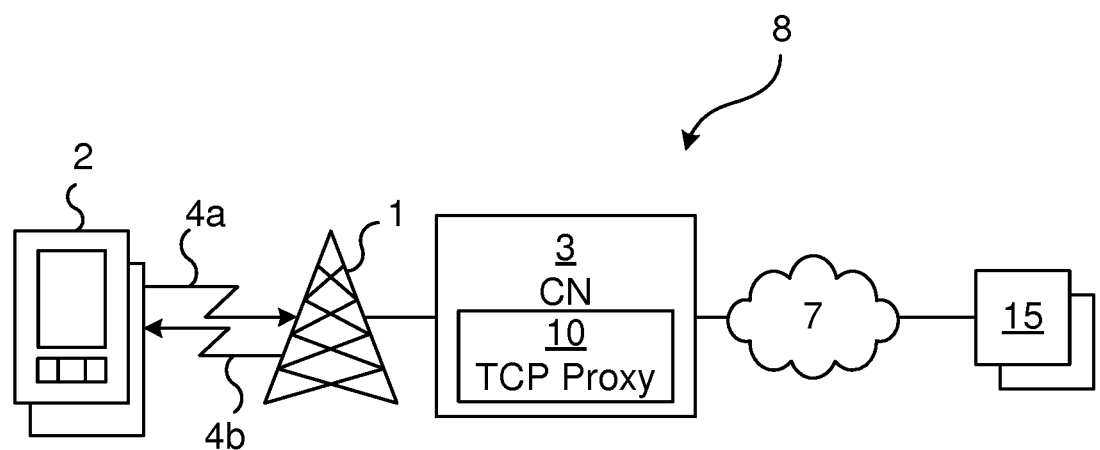
FIG. 1 is a schematic diagram illustrating an environment in which embodiments presented herein can be applied.

FIG. 1 is a schematic diagram illustrating a cellular network 8 where embodiments presented herein may be applied. The cellular network 8 comprises a core network 3 and one or more radio network nodes 1, here in the form of radio base stations being evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity over a wireless interface 4a-b to a plurality of mobile communication terminals 2. The term mobile communication terminal is also known as wireless device, user equipment (UE), mobile terminal, user terminal, user agent, wireless terminal, machine-to-machine device etc., and can be, for example, what today are commonly known as a mobile phone, smart phone or a tablet/laptop with wireless connectivity.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

The radio network node 1 is also connected to the core network 3 for connectivity to central functions. The core network comprises a TCP (Transport Control Protocol) proxy 10. The core network is connected to a wide area network (WAN) 7, such as the Internet. Also connected to the WAN is a plurality of hosts 15. A host is here to be construed to be any suitable computer device capable of communicating with the TCP proxy 10 via the WAN 7. The TCP Proxy is provided at an interface called Gi, which is an IP (Internet Protocol) based interface between a GGSN (Gateway GPRS Support Node) and the public data network (PDN) either directly to the internet or through a Proxy. The TCP proxy will manage all TCP traffic between mobile communication terminals 2 and hosts 15.

It is to be noted, as explained in more detail below, that the different hosts 15 are located at different communication distances from the TCP proxy. Communication distance is here to be construed as an indicator of the time it takes to communicate between two entities. Once example of a communication distance indicator is Round Trip Time (RTT). Alternatively, the RTT is used to classify hosts in one of predetermined set of classes (e.g. near distance, medium distance, or far away). The class can then be stored (optionally with a time to live indicator, implying when the classification needs to be redetermined) and used going forward as a communication distance indicator without the need to determine the RTT each time.

Over the wireless interface, uplink (UL) communication 4a occurs from the mobile communication terminal 2 to the radio network node 1 and downlink (DL) communication 4b occurs from the radio network node 1 to the mobile communication terminal 2. The quality of the wireless radio interface to each mobile communication terminal 2 can vary over time and depending on the position of the mobile communication terminal 2, due to effects such as fading, multipath propagation, interference, etc.

Figure 2:
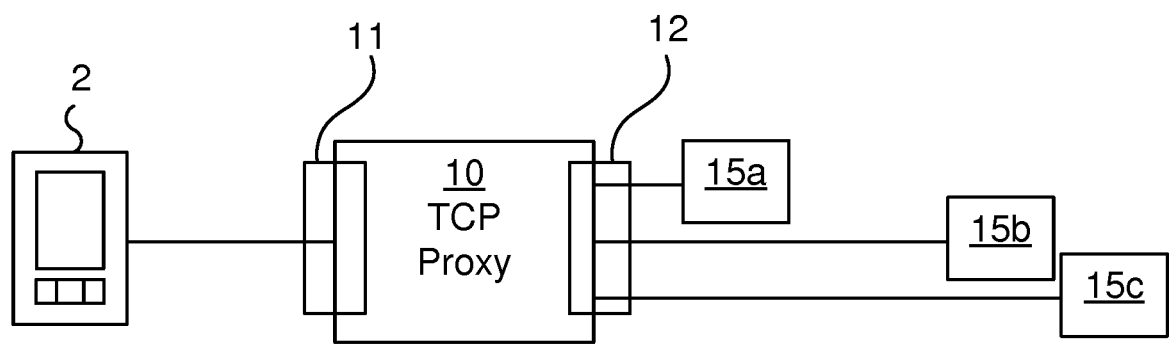
FIG. 2 is a schematic diagram further illustrating different communication distances between the TCP proxy and hosts, e.g. in the environment of FIG. 1.

FIG. 2 is a schematic diagram illustrating an environment in which embodiments presented herein can be applied, further illustrating different communication distances between the TCP proxy 10 and hosts 15a-c.

The TCP proxy 10 has a radio side 11, toward the mobile communication terminal 2, as well as a network side 12 towards the hosts 15a-c. Specifically, there are here a first host 15a, a second host 15b, and a third host 15c, all connected to the network side 12 of the TCP proxy 10. In this way, the hosts 15a-c can communicate with the mobile communication terminal 2.

It is to be noted that radio side 11 and the network side 12 are logical sides; the two sides 11, 12 can be provided by means of different physical ports provided physically next to each other on the TCP proxy 10. Moreover, the network side 12 can be implemented using one or more physical ports. In one embodiment, there is only one physical port on the network side 12 which connects to the various hosts 15a-c via routers and other network components. In one embodiment, there is a first physical port of the network side 12 connected to local hosts, e.g. the first host 15a, while a second physical port is connected to remote hosts e.g. the second and third hosts 15b-c.

Figure 3:
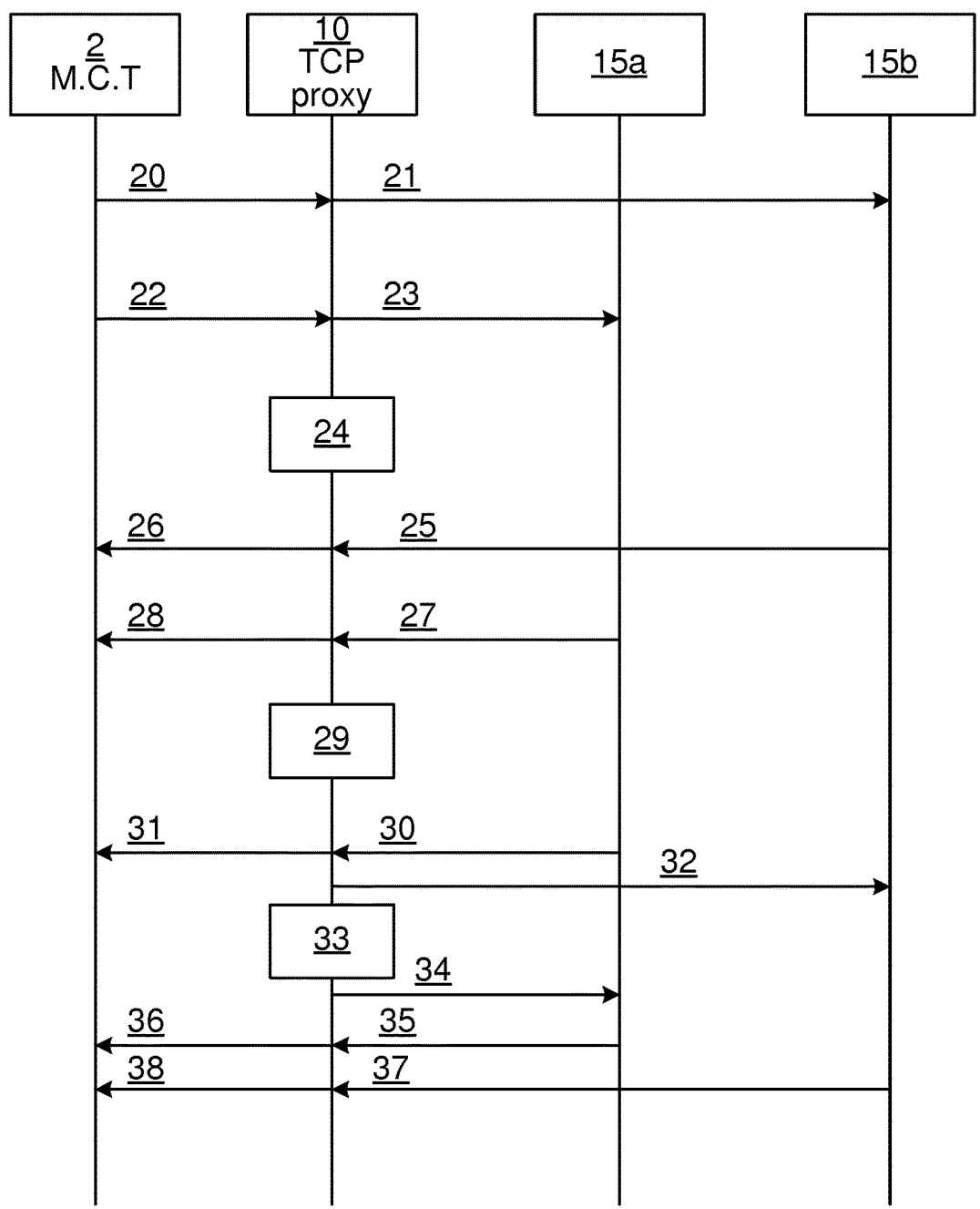
FIG. 3 is a sequence diagram illustrating communication between various entities of embodiments which can be applied in the environment of FIG. 1 according to one embodiment.

FIG. 3 is a sequence diagram illustrating communication between various entities of embodiments which can be applied in the environment of FIG. 1 according to one embodiment.

The mobile communication terminal 2 wants to set up a connection with the second host 15b. In order to make this happen, the mobile communication terminal establishes a first TCP connection 20 with the TCP proxy 10 and the TCP proxy 10 establishes a second TCP connection 21 with the second host 15b.

Additionally, the mobile communication terminal 2 wants to set up a connection with the first host 15a. In order to make this happen, the mobile communication terminal establishes a third TCP connection 22 with the TCP proxy 10 and the TCP proxy 10 establishes a fourth TCP connection 23 with the first host 15a.

The TCP proxy 10 gathers 24 communication distance indicators for the TCP connection 15a, 15b (corresponding to step 40 described below). In this example, the communication distance is shorter to the first host 15a than to the second host 15b.

Once the TCP connections 20-23 are established, the second host 15b can send data 25 to the TCP proxy 10 which forwards the data 26 to the mobile communication terminal 2. Analogously, the first host 15a sends data 27 to the TCP proxy 10 which forwards the data 28 to the mobile communication terminal 2.

At this point, the TCP proxy 10 detects 29 a constrained traffic situation (e.g. congestion) on the radio side, i.e. on the first and/or third TCP connections 20, 22 (corresponding to step 42 described below). According to embodiments presented herein, the host with shorter communication distance (the first host 15a in this example) continues to transmit data 30 to the TCP proxy 10, which forwards the data 28 to the mobile communication terminal 2. The TCP proxy 10 also sends a signal 32 to the host with longer communication distance (the second host 15b in this example) to reduce traffic from this host 15b (corresponding to step 44 described below). In this example, the second host 15b suspends all its traffic to the TCP proxy 10 as a result of the signal 32 from the TCP proxy 10.

Once the TCP proxy 10 detects 33 a traffic situation with increased capacity (e.g. removal of congestion) on the radio side (corresponding to step 46 described below), the TCP proxy 10 sends a signal 34 to increase traffic (corresponding to step 48 described below) from the host with shorter communication distance, here the first host 15a. Hence, the host with shorter communication distance (the first host 15a in this example) continues and increases its transmission of data 35 to the TCP proxy 10, which forwards the data 36 to the mobile communication terminal 2. Moreover, the second host 15b can now start to ramp up its transmission of data 37 to the TCP proxy 10 which forwards the data 38 to the mobile communication terminal 2.

Figure 4A:
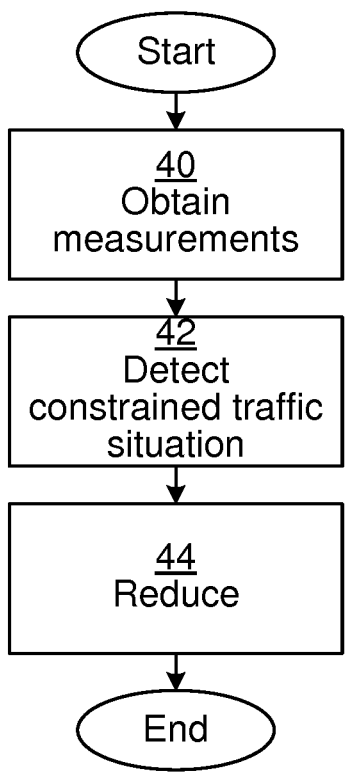
FIGS. 4A-B are flow charts illustrating embodiments of methods for controlling traffic between a mobile communication terminal and a plurality of hosts performed in the TCP proxy of FIG. 1.
Figure 4B:
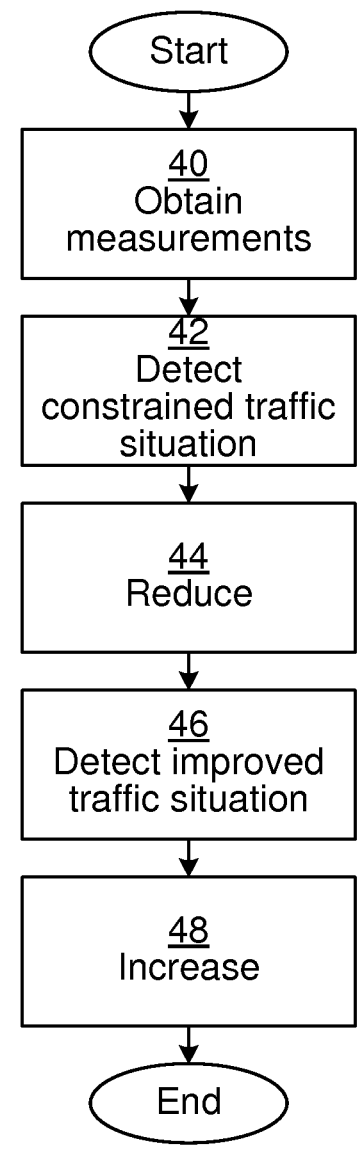

FIGS. 4A-B are flow charts illustrating embodiments of methods for controlling traffic between a mobile communication terminal 2 and a plurality of hosts, performed in the TCP proxy of FIG. 1. As explained above, the TCP proxy comprises a radio side towards the mobile communication terminal, and a network side towards the plurality of hosts. Several instances of the method can be performed in parallel, respectively for each one of a plurality of mobile communication terminals. Nevertheless, the methods are described below from the perspective of traffic for one such mobile communication terminal.

First, embodiments of methods illustrated in FIG. 4A will be described.

In an obtain indicators step 40, a communication distance indicator is obtained for each TCP connection between the TCP proxy and each one of the hosts. The communication distance indicator can e.g. be a round trip time, RTT. As explained above, the RTT could also be used to classify hosts in one of predetermined set of classes (e.g. near distance, medium distance, or far away), where the class for each host is then the communication distance indicator. In one embodiment, hosts are classified simply as local or remote based on knowledge of the location of the host (e.g. using its address). This classification is then one type of communication distance indicator.

In a detect constrained traffic situation step 42, a constrained traffic situation is detected on the radio side for traffic towards the mobile communication terminal. This detection can e.g. be based on increasing durations between acknowledgements (on the radio side). In one embodiment, this detection is based on durations between acknowledgements being greater than a threshold value. Alternatively or additionally, this detection can be based on detecting an increase in packet loss. In one embodiment, the constrained traffic situation is congestion. For instance, when the mobile communication terminal changes its radio connection from LTE to W-CDMA, the capacity is immediately greatly reduced, which can quickly result in congestion for downlink packets to the mobile communication terminal. Other reasons for the constrained traffic situation can e.g. be increased interference, fading or more subscribers entering the same area (e.g. radio cell).

In a reduce step 44, incoming traffic is reduced on the network side based on the respective communication distance indicators. This is performed such that traffic is reduced relatively more for a TCP connection with a large communication distance indicator compared to a TCP connection with a small communication distance indicator.

The reduction in traffic for a TCP connection can be implemented by reducing its receive window. In one embodiment, the incoming traffic for a TCP connection is reduced by setting its receive window to zero, effectively stopping incoming traffic for that TCP connection.

By reducing traffic more on TCP connections to hosts which are far away (in terms of communication distance), a higher amount of traffic is maintained for TCP connections to hosts which are near. In this way, when the constrained traffic situation eventually eases, control signals to increase traffic are sent to the near host, which can respond quicker with increased traffic volume. This fills up the newly available capacity quicker, compared to if hosts far away were to increase traffic, effectively reducing wasting available resources.

Looking now to FIG. 4B, only new or modified steps, compared to FIG. 4A, will be described.

In a detect improved traffic situation step 46, a traffic situation with increased capacity on the radio side for traffic towards the mobile communication terminal is detected. This detection can e.g. be based on detecting that durations between acknowledgements decrease. In one to embodiment, this detection is based on durations between acknowledgements being smaller than a threshold value. Threshold values can be used both in step 42 and 46 and the threshold values can be the same or they can differ from each other.

In an increase step 48, incoming traffic is increased on the network side based on the respective communication distance indicators. This is performed such that traffic is increased relatively more for a TCP connection with a small communication distance indicator compared to a TCP connection with a large communication distance indicator. In other words, traffic volume is increased for near hosts, for which control signals can be communicated faster.

Figure 5:
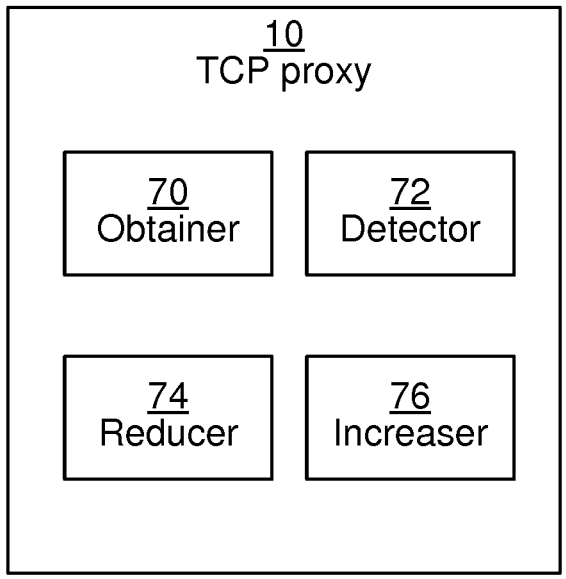
FIG. 5 is a schematic diagram showing functional modules of the TCP proxy of FIG. 1 according to one embodiment.

FIG. 5 is a schematic diagram showing functional modules of the TCP proxy to of FIG. 1 according to one embodiment. The modules are implemented using software instructions such as a computer program executing in the TCP proxy to. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

An obtainer 70 corresponds to step 40. A detector 72 corresponds to steps 42 and 46. A reducer 74 corresponds to step 44. An increaser 76 corresponds to step 48.

Figure 6:
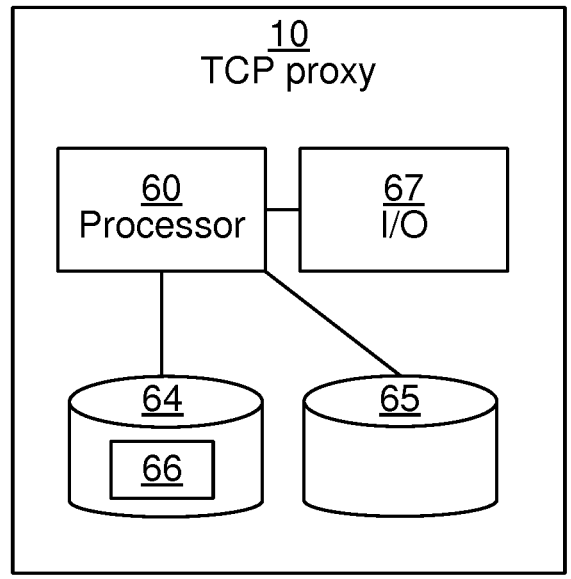
FIG. 6 is a schematic diagram illustrating components of the TCP proxy of FIG. 1 according to one embodiment.

FIG. 6 is a schematic diagram illustrating components of the TCP proxy to of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to to execute the embodiments of methods described with reference to FIGS. 4A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The TCP proxy to further comprises an I/O interface 67 for communicating with other external entities. For instance, the I/O interface 67 comprises one or more ports on a radio side, logically towards the mobile communication terminal, and one or more ports on the network side, logically towards the plurality of hosts. It is to be noted that the physical location of the ports on the radio side and network side does not matter as long as the logical connections are achieved as described.

Other components of the TCP proxy to are omitted in order not to obscure the concepts presented herein.

Figure 7:
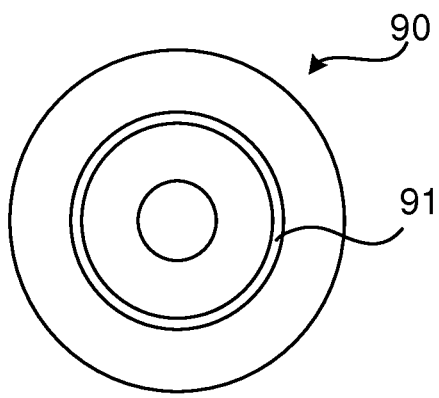
FIG. 7 shows one example of a computer program product comprising computer readable means.

FIG. 7 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling traffic between a mobile communication terminal and a plurality of hosts, the method being performed in a Transport Control Protocol (TCP) proxy of a cellular network, the TCP proxy comprising a radio side towards the mobile communication terminal, and a network side towards the plurality of hosts, the method comprising:
   obtaining a communication distance indicator for each TCP connection between the TCP proxy and each one of the hosts;
   detecting a constrained traffic situation on the radio side for traffic towards the mobile communication terminal; and
   reducing incoming traffic on the network side based on the respective communication distance indicators, such that traffic is reduced relatively more for a TCP connection with a large communication distance indicator compared to a TCP connection with a small communication distance indicator.

2. The method of claim 1, wherein the communication distance indicator is a round trip time.

3. The method of claim 1, wherein the reducing incoming traffic comprises reducing incoming traffic for a TCP connection by reducing its receive window.

4. The method of claim 3, wherein the reducing incoming traffic comprises reducing incoming traffic for a TCP connection by setting its receive window to zero.

5. The method of claim 1, wherein the detecting a constrained traffic situation comprises detecting that durations between acknowledgements increase.

6. The method of claim 1, wherein the detecting a constrained traffic situation comprises detecting an increase in packet loss.

7. The method of claim 1, further comprising:
detecting a traffic situation with increased capacity on the radio side for traffic towards the mobile communication terminal; and
increasing incoming traffic on the network side based on the respective communication distance indicators, such that traffic is increased relatively more for a TCP connection with a small communication distance indicator compared to a TCP connection with a large communication distance indicator.

8. The method of claim 7, wherein the detecting a traffic situation with increased capacity comprises detecting that durations between acknowledgements decrease.

9. The method of claim 1, wherein the method is performed in parallel for each one of a plurality of mobile communication terminals.

10. A Transport Control Protocol (TCP) proxy for controlling traffic between a mobile communication terminal and a plurality of hosts, the TCP proxy being configured to form part of a cellular network, the TCP proxy comprising:
a radio side intended to be logically directed towards the mobile communication terminal, a network side intended to be logically directed towards the plurality of hosts;
processing circuitry;
memory containing instructions executable by the processing circuitry whereby the TCP proxy is operative to:
obtain a communication distance indicator for each TCP connection between the TCP proxy and each one of the hosts;
detect a constrained traffic situation on the radio side for traffic towards the mobile communication terminal; and
reduce incoming traffic on the network side based on the respective communication distance indicators, such that traffic is reduced relatively more for a TCP connection with a large communication distance indicator compared to a TCP connection with a small communication distance indicator.

11. The TCP proxy of claim 10, wherein the communication distance indicator is a round trip time.

12. The TCP proxy of claim 10, wherein the instructions are such that the TCP proxy is operative to reduce incoming traffic by reducing the incoming traffic's receive window.

13. The TCP proxy of claim 12, wherein the instructions are such that the TCP proxy is operative to reduce incoming traffic for a TCP connection by setting its TCP proxy window to zero.

14. The TCP proxy of claim 10, wherein the instructions are such that the TCP proxy is operative to detect the constrained traffic situation comprise instructions by detecting that durations between acknowledgements increase.

15. The TCP proxy of claim 10, wherein the instructions are such that the TCP proxy is operative to detect the constrained traffic situation by detecting an increase in packet loss.

16. The TCP proxy of claim 10, wherein the instructions are such that the TCP proxy is operative to:
detect a traffic situation with increased capacity on the radio side for traffic towards the mobile communication terminal; and
increase incoming traffic on the network side based on the respective communication distance indicators, such that traffic is increased relatively more for a TCP connection with a small communication distance indicator compared to a TCP connection with a large communication distance indicator.

17. The TCP proxy of claim 16, wherein the instructions are such that the TCP proxy is operative to detect the traffic situation with increased capacity by detecting that durations between acknowledgements decrease.

18. The TCP proxy of claim 10, wherein the instructions are such that the TCP proxy is operative to execute the obtaining, detecting, and reducing in parallel for each one of a plurality of mobile communication terminals.

19. A non-transitory computer readable recording medium storing a computer program product for controlling a Transport Control Protocol (TCP) proxy for controlling traffic between a mobile communication terminal and a plurality of hosts, the TCP proxy being configured to form part of a cellular network, the TCP proxy comprising a radio side intended to be logically directed towards the mobile communication terminal, and a network side intended to be logically directed towards the plurality of hosts, the computer program product comprising software instructions which, when run on processing circuitry of the TCP proxy, causes the TCP proxy to:
obtain a communication distance indicator for each TCP connection between the TCP proxy and each one of the hosts;
detect a constrained traffic situation on the radio side for traffic towards the mobile communication terminal; and
reduce incoming traffic on the network side based on the respective distance indicators, such that traffic is reduced relatively more for a TCP connection with a large communication distance indicator compared to a TCP connection with a small communication distance indicator.

* * * * *